United States Patent Office 2,767,202
Patented Oct. 16, 1956

2,767,202

CATALYTIC HYDROGENATION OF CARBON MONOXIDES

Walter Rottig, Oberhausen-Sterkrade-Nord, Germany, assignor to Ruhrchemie Aktiengesellschaft, Oberhausen-Holten, Germany, and Lurgi Gesellschaft fur Warmetechnik m. b. H., Frankfurt am Main, Heddernheim, Germany, both German corporations No Drawing. Application January 27, 1953,
Serial No. 333,606

Claims priority, application Germany January 30, 1952

11 Claims. (Cl. 260—449.6)

This invention relates to improvements in the catalytic hydrogenation of carbon monoxides.

The use of iron, cobalt and nickel catalysts for the catalytic hydrogenation of carbon monoxide using gas mixtures containing carbon monoxide and hydrogen is well-known in the art. In addition, metals of the platinum group, as for example ruthenium, have been suggested for this purpose.

The known catalysts for the methanol synthesis include copper-containing catalysts and oxide catalysts as, for example, zinc oxide and chromium oxide catalysts. Oxide catalysts such as aluminum oxide and thorium oxide have also been used for effecting the so-called iso-synthesis.

In the catalytic hydrogenation of carbon monoxide using as catalysts metals of the iron group, such as iron, cobalt and nickel with the recovery of liquid aliphatic hydrocarbons and oxygenated compounds, the use of so-called activators and promoters is well known. For this purpose practically all metals and non-metals of the periodic system have been used and particularly members of the first, second, third, fourth and fifth groups of the periodic system. Among the activators which are most frequently used according to the literature of the art are, in addition to the alkalis, the elements thorium, aluminum, silicon, calcium, magnesium and copper, depending on the type of catalyst. It is known that specific activators must be used with specific types of catalysts, since only when using the correct activators with a given catalyst will relatively small amounts affect the activation. Thus, for example, calcium is an excellent activator for iron catalysts and yet has a detrimental effect on the activity of cobalt catalysts. Similarly, the use of copper as an activator is favorable only with iron catalysts but disadvantageous for use with nickel and cobalt catalysts. Silver is claimed to have a similar effect on iron catalysts as copper. The quantities of the activators generally used for the activation range between approximately 0.5 to 5% by weight of the metal of the iron group present.

In certain iron catalysts and particularly with the so-called "roasted catalysts" as much as 30% by weight of copper and in certain cases even as much as 100% by weight of copper with reference to the iron present has been suggested. The so-called "roasted catalysts," however, give unfavorable results with reference to the yield of synthesis products obtained, the life of the catalyst, etc. These "roasted catalysts" were used only for the synthesis of hydrocarbons. In general the quantity of copper contained in iron catalysts never amounted to more than 5%.

One object of this invention is the catalytic hydrogenation of carbon monoxide with the use of precipitated copper catalysts containing iron. This and still further objects will become apparent from the following description:

It has now been found in accordance with the invention that the catalytic hydrogenation of carbon monoxide may be effected with excellent results with the use of precipitated copper catalysts which contain iron preferably in amounts of 5 to 50%.

The catalytic carbon monoxide hydrogenation in accordance with the invention may be effected at atmospheric pressure or pressures up to as high as 100 atmospheres. The preferable pressures are between about 10 and 50 atmospheres. The hydrogenation is effected at temperatures of about 150 to 300° C. and preferably 190 to 250° C. The synthesis products obtained, if desired, may have a high content of oxygenated compounds and preferably aliphatic alcohols or, if desired, they may consist chiefly of either low molecular weight or higher molecular weight hydrocarbons of a high olefin content.

The catalysts as mentioned are precipitated catalysts consisting of copper and iron in a proportion of 50:50 to about 95:5 by weight. The catalysts in accordance with the invention may be activated in conventional manner with conventional activators, as for example alkaline earth, alkalis, oxides of zinc, chromium, aluminum, thorium, in quantities of 0.5–5% by weight of the present iron and may, if desired, contain supporting materials in quantities of 5–50% based on the total weight of the catalyst.

This result is very surprising and more so in view of the known fact that in general, when exceeding the optimum content in the activators exemplified above, merely a dilution of the respective catalyst will occur even if using, for example, the likewise catalytically acting oxides of zinc, chromium, aluminium and thorium.

It is of advantage to use bivalent copper salts such as, for example, copper nitrate, copper chloride or copper sulfate as starting compounds for the catalysts in accordance with the invention. Monovalent copper salts are less suitable. In addition to copper, iron is used as activator to a more or less large extent. Frequently, alkaline earths will also be of advantage. In principle, the use of the other known activators for carbon monoxide hydrogenation catalysts is also possible with the new catalysts. The latter are conveniently used in the form of their salts such as in the form of nitrates, chlorides or sulfates.

The precipitation of the catalysts used in accordance with the invention is advantageously effected at temperatures of about 80° to 110° C. with the addition of boiling alkali solutions such as, for example, sodium carbonate, potassium hydroxide and ammonia. Precipitation temperatures below 80° C. are less suitable. Although active catalysts may be obtained at such temperatures, the filtration becomes more difficult as the temperature decreases. It is of advantage to add the copper solution to the alkali solution. The precipitation time should be as short as possible. The concentration of the salts in the solutions may be varied. The preferred concentration is about 20 to 60 grams/liter of copper. The alkali concentration should be about 50 to 120 grams/liter in the form of hydroxide or carbonate. Higher and lower concentrations may also be used. Though the precipitation itself may be effected batchwise, a continuous precipitation is particularly advantageous because a more homogeneous catalyst structure is obtained. Moreover, the activity of the catalyst is in general increased to a certain extent. Continuously precipitated catalysts are particularly easily reproducible. In their production, the solutions required for the precipitation are taken from two storage containers. The solutions of the two starting liquid streams are at first heated since also for the continuous precipitation a hot precipitation has proved particularly advantageous. The operating temperatures range in general between about 80° and 110° C.

The pH value of the precipitate may range between 6 and 11 and preferably between 7 and 9. Particularly well suited for the pH measurement are the recently marketed instruments with high temperature-resistant glass electrodes. In addition to an even addition of the solutions, a constant pH value during the precipitation and a constant precipitation temperature, it has proved particularly essential for the production of highly active catalysts to effect a particularly intimate mixing of the two solutions in the moment they are combined. For this purpose, mixing nozzles of various construction may be used. It is also possible to intimately mix the two solutions by means of a turbo stirrer or to pass the two streams by force according to a certain process to an intermixing. After the first intermixing, a further short-time stirring or homogenizing such as in a small intermediate container is of advantage while always the same temperatures as used in the precipitation must be used. This measure is necessary especially when producing carrier-containing catalysts the use of which has been found to be particularly favorable in certain cases. The supporting substances such as kieselguhr, bleaching earths, aluminum oxide, tonsil (bleaching earth which is activated with hydrochloric or sulfuric acid), etc. are added at this point to the precipitation.

After the termination of the precipitation the catalyst slurry is to be freed as quick as possible from the excess precipitation alkali. For this purpose the slurry is washed as quick as possible with hot water, it being possible to use both condensed or tap water. If it is desired to so conduct the synthesis as to obtain a high yield of oxygenated compounds, the catalyst is to be adjusted to an alkali content of 1 to 50% calculated as $K_2O$ and referred to the iron present. This alkali content may be obtained either by a partial wash or by impregnating with alkali, particularly favorable results being obtained with the use of potassium compounds.

If, on the other hand, the synthesis is to be conducted to obtain synthesis products which preferably consist of hydrocarbons, a $K_2O$ calculated alkali content of less than 5% referred to the Fe is required in the catalyst at a ratio of 90 Cu:10 Fe in the catalyst. If the catalyst contains 50 parts of Cu for every 50 parts of Fe, an alkali content of less than 1% should be maintained. This alkali content is advantageously maintained by extensively washing out the excess precipitation alkali. For the hydrocarbon synthesis, the impregnation of the catalyst mass with alkali salts of phosphoric, silicic or boric acid has proved particularly advantageous. When using alkali salts of phosphoric acid, a ratio of alkali oxide (calculated as $K_2O$) to $P_2O_5$ of about 1:1 in these catalysts is particularly favorable. The same holds for the impregnation with alkali salts and preferably potassium salts of boric acid, the preferred $K_2O:B_2O_3$ ratio being correspondingly 1:1. When using alkali salts and preferably potassium salts of silicic acid, it is advisable to maintain a $K_2O:SiO_2$ ratio of between 1:3 and 1:6 with the use, if necessary or desired, of an after-neutralization with nitric acid.

By selecting suitable measures for obtaining a primary product with as high as possible a content of oxygenated compounds or suitable measures for obtaining a primary product with as high as possible a yield of low molecular weight or high molecular weight hydrocarbons or combining such measures it is possible to produce at will primary products which contain from about 3% to 70% of oxygenated compounds, preferably of alcohols, referred to the total product.

After the impregnation it is of advantage to mold the catalyst mass, the molding being preceded, if necessary or desired, by an intermediate drying. Extruding presses or the like have proved particularly favorable. For small outputs mechanical crushing of the precipitated and dried catalyst mass without previous molding may be sufficient under certain circumstances. In this way a so-called lump catalyst is obtained. Thereafter, the catalyst mass is dried to a low water content. This water content may be as high as 15% and preferably 3% to 8%. The drying temperature should be between 50° and 150° C. and preferably between 70° C. and 110° C.

Similar to nearly all catalysts for the carbon monoxide hydrogenation, a reduction of the catalyst with hydrogen and/or carbon monoxide-containing gases is required prior to use. Low reduction temperatures ranging between 150° C. and 300° C. and preferably between 150° and 250° C. are possible due to the high copper content. The reduction temperature is determined by the particular use of the catalyst. In general, the synthesis of hydrocarbons requires low reduction values of preferably below 40% and consequently low reduction temperatures and short reduction periods. Reduction value as herein used is the content of free iron. Catalysts which effect the preferred formation of oxygenated compounds should have reduction values of above 40% and preferably of above 60%. They require higher reduction temperatures and extended reduction periods. In all cases the use of high gas flow rates in the reduction is of advantage. The gas flow rates range between 30 and 200 cm./second and preferably between 100 and 150 cm./second referred to standard conditions. This measure has in addition the advantage that the layer depth of the catalyst mass to be reduced may be increased to an extremely high degree. For example, layer depths of 50 cm. to 20 m. and preferably of 5 to 12 m. may be used with no difficulties being encountered in obtaining a thorough and uniform reduction of the whole mass. After the reduction the whole catalyst mass has a uniform reduction value. According to the prior art, the reduction of catalysts of this type has been effected in layer depths of 1 to 35 cm. One advantage of the new reduction method with the greater layer depths is that due to the low reduction temperature required by the catalysts to be used in accordance with the invention the reduction may be carried out without any difficulty in the synthesis reactor itself thereby eliminating the necessity for the erection of a special reduction apparatus.

The reducing gas is conveniently used under atmospheric pressure. It is possible, however, to operate with diminished pressure or slight excess pressure. Recycling of the reducing gas which shall be as free as possible from water and should contain less than 1 gram of water/cu. m. is practical.

The catalysts according to the invention will give good results in a synthesis conducted even at atmospheric pressure. The gas composition may be varied from about 2 CO:1 $H_2$ to above 1 CO:2 $H_2$. The best results are obtained when using pressures of more than 5 atmospheres and preferably of more than 10 atmospheres. Owing to the excellent activity of the catalysts, it is possible to easily increase the gas load beyond the level conventionally used so far in large-scale operation. For example, 500 liters and more of the synthesis gas per liter of catalyst per hour may be charged to the catalyst.

A particular advantage of the catalysts described above is their surprisingly favorable thermal conductivity. The result of this is that they are less sensitive to temperature fluctuations with regard to carbon deposits than are conventional catalysts such as iron, nickel or cobalt catalysts.

Similar to almost all catalysts, the use of gas recycling, i. e. the returning of a part of the tail gas to the synthesis reactor, is of advantage though it is also possible to operate with a straight passage of the gas. The synthesis reactor which is operated with the catalyst according to the invention may be cooled with water thus providing uniform temperatures within the reactor. It is also possible, however, to use other cooling media which consist, for example, of several components thereby providing the possibility of operating the synthesis with temperature gradients. While high conversion rates may be obtained even with single-stage operation, multi-stage operation with the removal of a part of the carbon dioxide formed in the synthesis is frequently of advantage. Catalyst layers of, for example, 10 meters and more may be used in the synthesis.

The following examples are given to illustrate the invention and not to limit the same.

Example 1

A solution consisting of copper nitrate and iron nitrate and having a concentration of copper of 40 gms./liter plus the corresponding quantities of iron and a copper: iron ratio of 75:25 was continuously combined in the hot state (90–100° C.) with a hot soda solution of likewise about 100° C. so that the pH value during the precipitation was constantly about 9–9.2. The concentration of the soda solution was about 100 gms./liter of anhydrous $Na_2CO_3$.

The precipitated catalyst mass was extensively freed from alkali (0.4% residual alkali calculated as $K_2O$ and referred to the total catalyst mass) by washing it with hot condensate and was subsequently impregnated with potassium carbonate in such a manner that 8 $K_2O$ calculated parts based on iron corresponding to 2 parts as based on the total catalyst were present. This mass was then dried for 24 hours at 110° C. in a drying chamber, crushed and sieved to a grain size between 2 and 4 mm.

The reduction of the catalyst was carried out for 2 hours at 300° C. with the use of a mixture which consisted of 75% $H_2$ and 25% $N_2$ thus effecting an approximately complete conversion of both the copper and the iron into the metallic state. 4.8 liters of this catalyst were operated in a so-called double-tube furnace (24 x 44 mm.) at a synthesis pressure of 30 atmospheres and a gas load of 100 liters of gas/liter of catalyst per hour with water gas in once-through operation. At a temperature of 200° C. a conversion of 61–62% was obtained while the formation of methane was 6% based on $CO+H_2$ converted.

The resulting liquid product contained 33% constituents boiling above 320° C. in which considerable quantities (above 45%) of esters were present. The content of oxygenated products in the individual fractions was as follows:

| Fraction | Esters, Percent | Alcohols, Percent | Aldehydes and ketones, Percent |
| --- | --- | --- | --- |
| above 320° C | above 45 | | |
| 180–320° C | 40 | 8 | |
| 100–180° C | 15 | 35 | 8 |

Larger quantities of water-soluble oxygenated compounds, especially of alcohols, were contained in the reaction water.

When using twice the gas load, the $CO+H_2$ conversion at 218° C. was 62% and the methane formation was approximately 7 based on $CO+H_2$ converted. The liquid product contained 29% constituents boiling above 320° C. The ester content in all fractions decreased slightly while inversely the content of alcohols in all fractions increased correspondingly.

With a gas load of 300 liters per liter of catalyst per hour, a $CO+H_2$ conversion of 62% was obtained at 226° C. The methane formation was 8 based on $CO+H_2$ converted. The liquid product contained approximately 26% constituents boiling above 320° C. The quantity of esters and alcohols remained practically unchanged as compared with the previous experiments.

When increasing the gas load to 400 volumes/volume of catalyst per hour, a $CO+H_2$ conversion of 62.5% was obtained at a temperature of 235° C., while the methane formation was about 8.7 based on $CO+H_2$ converted. The yield of esters and alcohols decreased slightly.

If the gas load was finally increased to 500 volumes/volume of catalyst per hour, a conversion of 60% was obtained at 242° C. The methane formation in this case was 9.0 based on $CO+H_2$ converted. The yield of esters and alcohols decreased further somewhat but was still as follows:

| Fraction | Esters, Percent | Alcohols, Percent |
| --- | --- | --- |
| above 320° C | 34 | 3 |
| 180–320° C | 32 | 10 |
| 100–180° C | 10 | 43 |

Larger quantities of low molecular weight oxygenated compounds were again contained in the reaction water. The portion of compounds boiling above 320° C. in the liquid product was 26%.

Example 2

In the same manner as set forth in Example 1, a catalyst was prepared which contained 10 parts of iron for every 100 parts of copper and was impregnated with potassium carbonate in such a manner that 8 $K_2O$ calculated parts were present based on copper present. The reduction was effected under the conditions set forth in Example 1.

In an experimental reactor similar to that of Example 1 using water gas a $CO+H_2$ conversion of 65% was obtained at a synthesis pressure of 30 atmospheres, a temperature of 236° C. and a gas load of 100 volumes of gas per volume of catalyst per hour. The methane formation was 8% based on $CO+H_2$ converted. The liquid product contained 28% constituents boiling above 320° C. The content of esters and alcohols in the individual fractions was as follows:

| Fraction | Esters, Percent | Alcohols, Percent |
| --- | --- | --- |
| above 320° C | 36 | 17 |
| 180–320° C | 32 | 12 |
| 100–180° C | 17 | 22 |

The reaction water contained likewise larger quantities of low molecular weight oxygenated compounds.

Example 3

From a solution which contained iron and copper in a proportion of 1:1 with the metals being in the form of their nitrates and having a concentration of 45 gms./liter, a catalyst was precipitated by adding this hot solution to a weakly boiling potassium carbonate solution. The pH value after precipitation was 7.1. After the conventional wash the mass was impregnated with potassium carbonate, calculated as $K_2O$, in such a manner that 8 parts $K_2O$ for every 100 parts of iron were present. After drying for 24 hours at 110° C. the catalyst mass was crushed and sieved to a grain size between about 1.5 and 3.5 mm. The reduction was effected for 90 minutes at 300° C. with hydrogen using a linear gas velocity of 1.5 meters/second. The reduction value was approximately 62%.

If this catalyst was operated in once-through operation in one of the reactors mentioned above at a synthesis pressure of 30 atmospheres with water gas, a $CO+H_2$ conversion of 72% was obtained at a temperature of 200° C. The methane formation was 7.7% based on $CO+H_2$ converted.

If the same catalyst was operated under the same conditions with a gas consisting of approximately 50 parts of carbon monoxide, 40 parts of hydrogen, the remainder being carbon dioxide, nitrogen and methane, a $CO+H_2$ conversion of 67% could be obtained at a temperature of 198° C. The methane formation was 4% referred to $CO+H_2$ converted.

If the same catalyst was operated under the same conditions as set forth above with a synthesis gas which contained about 31% CO, 61% $H_2$, the remainder being carbon dioxide, nitrogen and methane, a $CO+H_2$ conversion of 55% was obtained at a temperature of 195° C. The methane formation was about 7% based on $CO+H_2$ converted.

The liquid products obtained in all experiments contained considerable amounts of oxygenated compounds. Thus, in the first case, the following quantities of esters, alcohols and oxo compounds were contained in the individual fractions:

| Fraction | Esters, Percent | Alcohols, Percent | Oxo compounds, Percent |
|---|---|---|---|
| above 320° C | 45 | 5 | |
| 180–320° C | 33 | 17 | |
| 100–180° C | 14 | 32 | 7 |

The portion of products boiling above 320° C. was 31% based on total liquid product.

With the carbon monoxide-rich gas, the portion of products boiling above 320° C. was 52% based on total liquid product. The content of esters, alcohols and oxo compounds was as follows:

| Fraction | Esters, Percent | Alcohols, Percent | Oxo compounds, Percent |
|---|---|---|---|
| above 320° C | 50 | 3 | |
| 180–320° C | 30 | 10 | 3 |
| 100–180° C | 13 | 31 | 9 |

With the hydrogen-rich gas, the liquid product contained 35% of constituents boiling above 320° C. The yield of esters, alcohols and oxo compounds in the fractions were as follows:

| Fraction | Esters, Percent | Alcohols, Percent | Oxo compounds, Percent |
|---|---|---|---|
| above 320° C | 29 | 7 | |
| 180–320° C | 23 | 30 | 3 |
| 100–180° C | 7 | 41 | 6 |

*Example 4*

A catalyst consisting of 75 parts of copper and 25 parts of iron was precipitated in the same manner as set forth in Example 3. After washing in conventional manner the catalyst mass was impregnated with secondary potassium phosphate in such a manner that the same $K_2O$ calculated quantity of potassium phosphate based on iron was contained in the catalyst. After drying and crushing in conventional manner, the catalyst was reduced for 2 hours at a temperature of 300° C. with hydrogen at a flow rate of 1.5 meters/second.

In a synthesis reaction similar to that used in the preceding examples, a $CO+H_2$ conversion of 65% was obtained with the use of water gas at a temperature of 210° C. while the methane formation was 5% based on $CO+H_2$ converted. The synthesis pressure was 30 atmospheres.

The liquid product obtained contained 36% constituents boiling above 320° C. The content of esters and alcohols in the individual fractions was as follows:

| Fraction | Esters, percent | Alcohols, percent |
|---|---|---|
| above 320° C | 35 | 3 |
| 180–320° C | 35 | 10 |
| 100–180° C | 17 | 45 |

*Example 5*

A catalyst was precipitated in accordance with Example 1 and was then impregnated with potassium water gas in such a manner that 5 parts $K_2O$ and 25 parts $SiO_2$ were contained therein. After drying at 110° C. and sieving to a grain size of 1.5–3 mm., the catalyst was reduced for 60 minutes at a temperature of 200° C. This catalyst was operated in one of the synthesis reactors mentioned above with water gas at a synthesis pressure of 10 atmospheres and a recycle ratio of 1:2.5. At a temperature of 215° C. a $CO+H_2$ conversion of 61% was obtained with a methane formation of about 2 based on $CO+H_2$ converted. The liquid product obtained contained about 70% constituents boiling above 320° C. The individual fractions contained the following quantities of oxygenated compounds and olefins:

| Fraction | Oxygenated compounds, percent | Olefins, percent |
|---|---|---|
| above 320° C | 3 | |
| 180–320° C | 12 | 65 |
| 100–180° C | 15 | 67 |

*Example 6*

A catalyst was prepared in accordance with Example 5 but was impregnated with 1.5 parts $K_2O$ and 4 parts $SiO_2$ based on the total catalyst rather than with 5 parts $K_2O$ and 25 parts $SiO_2$. The grain size and the reduction and synthesis conditions were identical with those set forth in Example 5. The reaction temperature was 211° C., the $CO+H_2$ conversion was 63%.

The liquid product obtained contained 25% constituents boiling above 320° C. in which small amounts of esters were contained. The other fractions contained the following amounts of oxygenated compounds and olefins:

| Fraction | Oxygenated compounds, percent | Olefins, percent |
|---|---|---|
| 180–320° C | 15 | 55 |
| 100–180° C | 10 | 61 |

I claim:

1. A precipitated copper, carbon monoxide hydrogenation catalyst containing copper and iron in a proportion of 50:50 to 95:5 with a substantial portion of both said copper and iron in reduced metallic form and having an alkali content of about 1–50% calculated as $K_2O$ referring to the iron present.

2. A catalyst according to claim 1, which includes an activator selected from the group consisting of thorium, aluminum, silicon, alkaline earths, and magnesium in quantities of 0.5–5% by weight of the iron present.

3. Catalyst according to claim 1 which includes a supporting material selected from the group consisting of kieselguhr, bleaching earths, aluminum oxide and a bleaching earth activated with a member selected from the group consisting of hydrochloric acid and sulfuric acid in quantities of 5–50 percent based on the weight of the whole catalyst.

4. A catalyst according to claim 1 having a free metal content of more than 40% based on the iron present.

5. A catalyst according to claim 1 having a free metal content of more than 60% based on the iron present.

6. A catalyst according to claim 1 including an alkali salt of phosphoric acid present in amount to give a ratio of $K_2O:P_2O_5$ of about 1:1.

7. A catalyst according to claim 1 including an alkali salt of boric acid present in amount sufficient to give a ratio of $K_2O:B_2O_3$ of about 1:1.

8. A catalyst according to claim 1 including an alkali salt of silicic acid present in amount sufficient to give a ratio of $K_2O:SiO_2$ of between about 1:3 to 1:6.

9. In the process for the catalytic hydrogenation of carbon monoxide, the improvement which comprises con-

9 tacting a carbon monoxide hydrogen-containing synthesis gas with a precipitated copper catalyst containing copper and iron in the proportion of 50:50 to 95:5 and having an alkali content of from 1-50% calculated as $K_2O$ referring to the iron present, at a temperature of about 150-300° C. and a pressure of about 1-100 atmospheres, and recovering a synthesis product containing a high yield of oxygenated compounds.

10. Improvement according to claim 9 in which said contacting is effected at a temperature of 190-250° C. and a pressure of about 10-30 atmospheres.

11. Improvement according to claim 9, in which said catalyst contains Cu:Fe in the proportion of 90:10 and has as alkali content of less than 5% calculated as $K_2O$ referring to the iron present, and in which the recovered synthesis product predominantly consists of hydrocarbons.

References Cited in the file of this patent

UNITED STATES PATENTS

| | | |
|---|---|---|
| 2,234,246 | Groombridge et al. | Mar. 11, 1941 |
| 2,254,748 | Michael et al. | Sept. 2, 1941 |
| 2,257,457 | Fischer et al. | Sept. 30, 1941 |
| 2,275,181 | Ipatieff et al. | Mar. 3, 1942 |
| 2,414,585 | Eggertsen | Jan. 21, 1947 |
| 2,500,331 | Voorhees | Mar. 14, 1950 |
| 2,598,647 | McGrath | May 7, 1952 |
| 2,702,814 | Riblett | Feb. 22, 1955 |

OTHER REFERENCES

Storch et al.: "The Fischer-Tropsch and Related Synthesis" (1951), pp. 241-2. John Wiley and Sons, Inc., New York.

---

UNITED STATES PATENT OFFICE

CERTIFICATE OF CORRECTION

Patent No. 2,767,202            October 16, 1956

Walter Rottig

It is hereby certified that error appears in the printed specification of the above numbered patent requiring correction and that the said Letters Patent should read as corrected below.

Column 8, line 2, for "gas" read --glass--.

Signed and sealed this 26th day of February 1957.

(SEAL)
Attest:

KARL H. AXLINE                                                         ROBERT C. WATSON
Attesting Officer                                                   Commissioner of Patents

9 tacting a carbon monoxide hydrogen-containing synthesis gas with a precipitated copper catalyst containing copper and iron in the proportion of 50:50 to 95:5 and having an alkali content of from 1–50% calculated as $K_2O$ referring to the iron present, at a temperature of about 150–300° C. and a pressure of about 1–100 atmospheres, and recovering a synthesis product containing a high yield of oxygenated compounds.

10. Improvement according to claim 9 in which said contacting is effected at a temperature of 190–250° C. and a pressure of about 10–30 atmospheres.

11. Improvement according to claim 9, in which said catalyst contains Cu:Fe in the proportion of 90:10 and has as alkali content of less than 5% calculated as $K_2O$ referring to the iron present, and in which the recovered synthesis product predominantly consists of hydrocarbons.

References Cited in the file of this patent

UNITED STATES PATENTS

| | | |
|---|---|---|
| 2,234,246 | Groombridge et al. | Mar. 11, 1941 |
| 2,254,748 | Michael et al. | Sept. 2, 1941 |
| 2,257,457 | Fischer et al. | Sept. 30, 1941 |
| 2,275,181 | Ipatieff et al. | Mar. 3, 1942 |
| 2,414,585 | Eggertsen | Jan. 21, 1947 |
| 2,500,331 | Voorhees | Mar. 14, 1950 |
| 2,598,647 | McGrath | May 7, 1952 |
| 2,702,814 | Riblett | Feb. 22, 1955 |

OTHER REFERENCES

Storch et al.: "The Fischer-Tropsch and Related Synthesis" (1951), pp. 241–2. John Wiley and Sons, Inc., New York.

---

UNITED STATES PATENT OFFICE

CERTIFICATE OF CORRECTION

Patent No. 2,767,202      October 16, 1956

Walter Rottig

It is hereby certified that error appears in the printed specification of the above numbered patent requiring correction and that the said Letters Patent should read as corrected below.

Column 8, line 2, for "gas" read --glass--.

Signed and sealed this 26th day of February 1957.

(SEAL)
Attest:

KARL H. AXLINE
Attesting Officer

ROBERT C. WATSON
Commissioner of Patents

UNITED STATES PATENT OFFICE

CERTIFICATE OF CORRECTION

Patent No. 2,767,202　　　　　　　　　　　　　　　　　October 16, 1956

Walter Rottig

It is hereby certified that error appears in the printed specification of the above numbered patent requiring correction and that the said Letters Patent should read as corrected below.

Column 8, line 2, for "gas" read --glass--.

Signed and sealed this 26th day of February 1957.

(SEAL)
Attest:

KARL H. AXLINE
Attesting Officer

ROBERT C. WATSON
Commissioner of Patents